United States Patent [19]

Kosten

[11] 4,355,212
[45] Oct. 19, 1982

[54] WALL TELEPHONE CRADLE ASSEMBLY

[75] Inventor: Richard B. Kosten, Huntsville, Ala.

[73] Assignee: GTE Automatic Electric Labs Inc., Northlake, Ill.

[21] Appl. No.: 172,337

[22] Filed: Jul. 25, 1980

[51] Int. Cl.³ .......................................... H04M 1/04
[52] U.S. Cl. ........................ 179/100 C; 179/146 R; 179/178
[58] Field of Search ............ 179/100 R, 100 C, 103, 179/146 R, 147, 178, 179

[56] References Cited

U.S. PATENT DOCUMENTS

| 3,845,252 | 10/1974 | Wooters | 179/146 R |
| 3,851,119 | 11/1974 | Tucker | 179/146 R |
| 3,956,600 | 5/1976 | Ray | 179/146 R |
| 3,990,764 | 11/1976 | Krumreich | 339/176 M |
| 4,250,356 | 2/1981 | Hammer, Jr. et al. | 179/146 R |

OTHER PUBLICATIONS

Communication Apparatus Company Advertisement, Telephony, Jan. 21, 1980.

Primary Examiner—Bernard Konick
Assistant Examiner—Randall P. Myers
Attorney, Agent, or Firm—Robert J. Black; Anthony Miologos

[57] ABSTRACT

A wall telephone cradle assembly comprised of a housing having a cup shaped pocket on a front face thereof, arranged to hold a hand-held telephone instrument therein. Mounting structures located within the housing are disposed to mount the assembly to a two pin wall telephone receptacle plate.

5 Claims, 4 Drawing Figures

WALL TELEPHONE CRADLE ASSEMBLY

BACKGROUND OF THE INVENTION (1) Field of the Invention

The present invention relates in general to the art of telephones, and in particular, to an apparatus which is useful for mounting a hand-held telephone to a wall or vertical surface.

(2) Description of the Prior Art

Within the last few years manufacturers of telephone equipment have been designing and offering to the consumer market a new generation of low cost compact telephone instrument. These "electronic" telephones include all necessary working components within a single hand-held package. This radical departure from the typical telephone instrument and its bulky base unit and separate handset is due mainly to advanced techniques of miniaturization and integrated circuit technology.

All the telephones of this new generation are designed as desk units, where when not in use rest on a horizontal surface. Wall mounted telephones on the other hand have become increasingly popular in a variety of locations in the home. Such as in the kitchen or workshop where they are mounted to a wall at a convenient height to the user. Thus it becomes advantageous to be able to mount the new hand-held telephone instruments to a vertical surface or wall.

In order to accomplish this end, an assembly which would hold such an instrument must not only simply fasten to a vertical surface but must be adaptable for use with permanently installed wall receptacle plates, in the same fashion as standard wall telephone instruments.

Typically, wall telephones are mounted to wall receptacles which use the industry standard two pin mounting. This particular mounting uses two equally spaced apart pins which extend outward from the receptacle plate for a certain distance and are adapted to engage a mounting plate on the rear wall of a wall telephone. The receptacle plate may further include a jack which provides the normal operating signals to the instrument.

While the two pin receptacle has become a standard means of securing and electrically connecting a wall telephone, the distance between the pins and the height of the pins varies between manufactures. Thus, the wall telephone mounting plates found on the telephone instrument of a particular manufacturer may only be used with the receptacle plates provided by that particular company. In consumer owned instruments it becomes a distinct advantage for that instrument to be accommodated on telephone wall receptacle plate pin configurations of different manufacturers.

Accordingly it becomes an object of the present invention to provide an assembly able to mount a hand-held telephone simply and effectively to vertical surface or wall.

SUMMARY OF THE INVENTION

In accomplishing the object of the present invention there is provided a wall-mounted receptacle plate which includes a pair of mounting studs having flanged ends. The studs are spaced equidistant from each other and also extend for a certain distance outwardly from the plate. The plate is secured on a vertical surface or wall at a height convenient to the user.

The invention contemplates the use of a unitary housing including a front surface arranged to cradle within a cup shaped pocket a hand-held telephone instrument such as that described in U.S. Pat. No. Des. 254,435, to J. R. Ferron, issued May 11, 1980. Mounting structures located within the housing include a pair of sloted mounting members which are disposed to engage respective receptacle plate mounting studs. The spacial arrangement of the sloted members together with a design flexibility allow accommodation of the frame on a variety of receptacle plates having various mounting stud heights and locations.

The first sloted member is arranged as a sloped ramp while the second sloted member is part of a T-shaped structure which is adapted to flex when manual pressure is applied to it.

To attach the frame to a receptacle plate pressure is first applied to the T-shaped structure in a direction to allow alignment of the respective mounting stud with the T-shaped structures sloted member. The first sloted member is also aligned with its respective mounting stud and the frame is moved in a downward direction, accommodating the sloted members on the mounting studs. Manual pressure is then relieved on the T-shaped structure which begins to return to its unflexed position but is retained by the second mounting studs flanged end. The T-shaped structure then maintains a force on the housings outer walls holding the assembly rigidly on the vertical surface or wall.

To lock the assembly in position over the receptacle plate a clip is inserted into a hole at the base of the T-structure. The clip is designed to wedge between an edge of the receptacle plate and an inner wall of the T-shaped structure.

BRIEF DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

Figure 1:
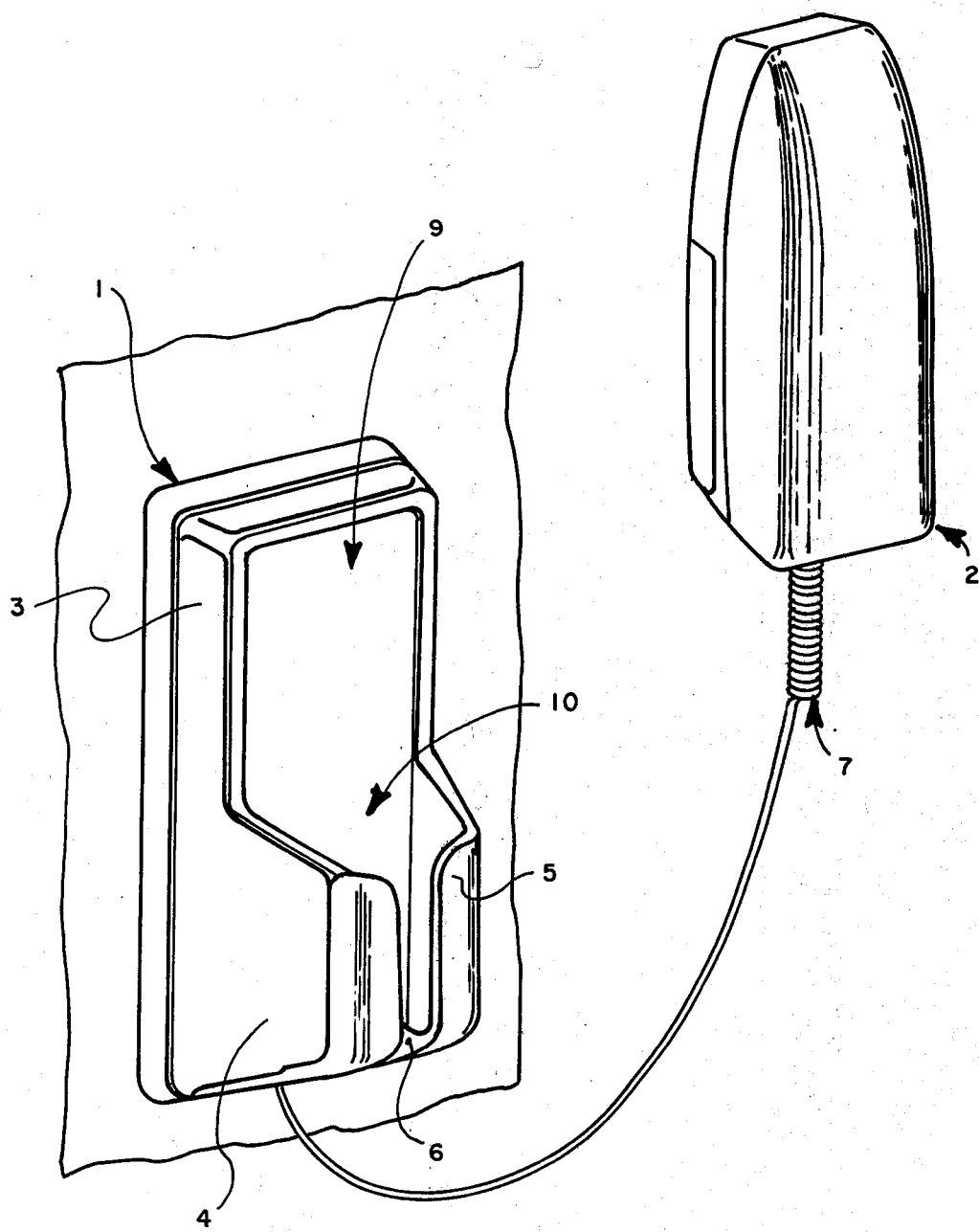
FIG. 1 is a perspective view illustrating the cradle assembly of the present invention shown in conjunction with a hand-held telephone instrument of the type to which the invention is applied.

Referring now to FIG. 1, there is illustrated in perspective view cradle assembly 1 of the present invention which is shown in conjunction with a hand-held telephone instrument 2, such as the one described in U.S. Pat. No. Des. 254,435 to J. R. Ferron. Cradle assembly 1 is comprised of a rectangular housing 3 including extended L-shaped wall portions 4 and 5 and a planar panel 9. Wall portions 4 and 5 in conjunction with panel 9 form a cup-shaped cradle area 10 which is arranged to accept telephone instrument 2 therein. A space 6 is provided between wall portions 4 and 5 to permit line cord 7 access through cup 10. Panel 9 is arranged to be removable to provide access to the mounting structures found in the interior of housing 3.

Figure 2:
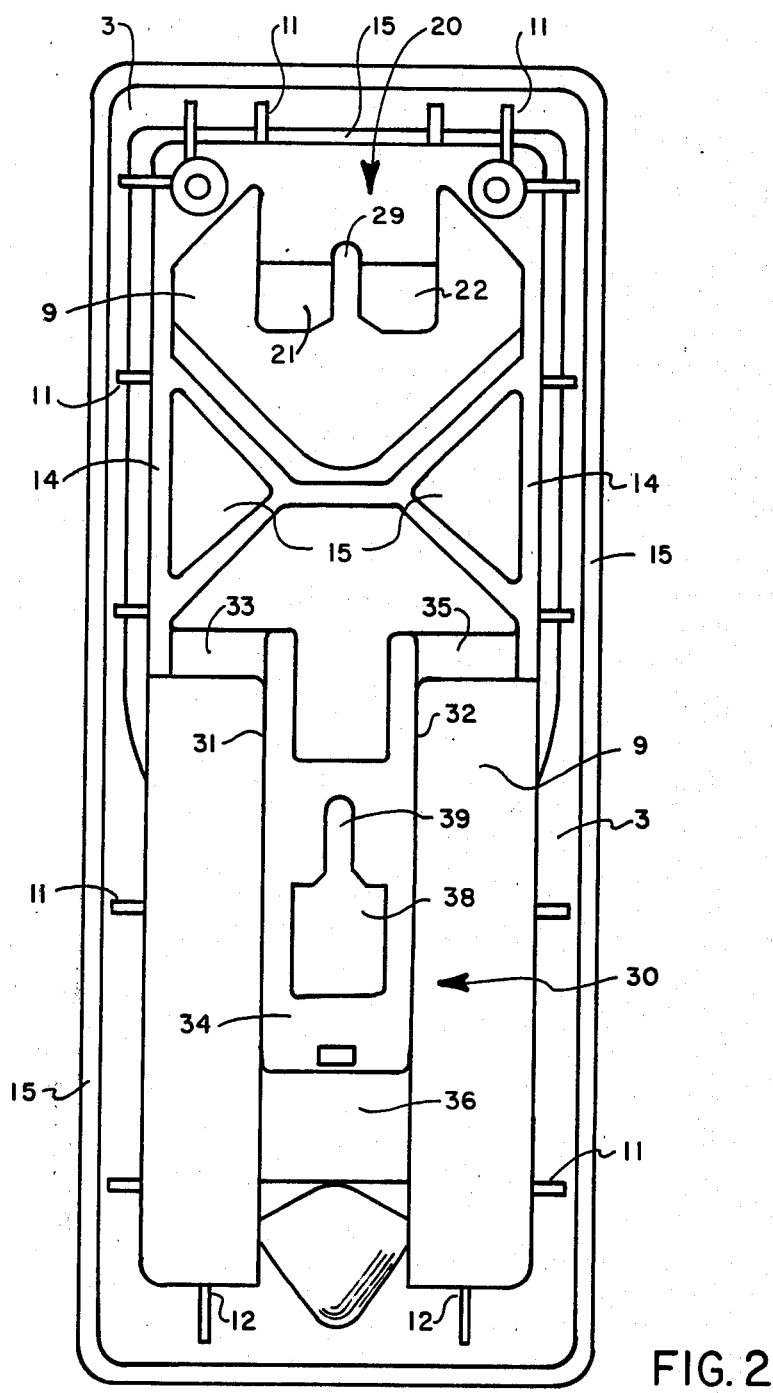
FIG. 2 is a rear view of the cradle assembly of the present invention.

Turning now to FIG. 2, the rear of cradle assembly 1 is illustrated which includes panel 9 installed. The upper most portion of panel 9 includes a tab (not shown) which is inserted into a recess 15 with the lower most portions of the panel resting on housing stiffeners 12. By bending the panel and removing the tab out of recess 15, panel 9 can be lifted out and removed from the housing. To increase the rigidity of housing 3 various stiffening ribs 11 have been integrally molded along with an upper frame 14 to the interior surface of the housing. Frame 14 includes a webbed structural member 15 providing transverse structural integrity to the housing and an upper mounting structure 20.

The upper mounting structure 20 includes a receiving channel 29 longitudinally oriented on the mounting structure and forming the end portion of the structure into two resilient tongues 21 and 22. Tongues 21 and 22 are arranged as inclined planes sloping towards the rear of the housing. A lower mounting structure 30 having rectangular and parallel side walls 31 and 32 and a rear surface 34 is flexibly mounted to the interior of the housing via transverse arms 33, 35 and longitudinal arm 36. A recess 38 leads to a receiving channel 39 longitudinally oriented and in linear alignment with receiving channel 29. The rear surface of housing 3 terminates in a perimeter rim 15 which lies substantially flush with a wall or vertical surface when the cradle assembly is installed.

Figure 3:
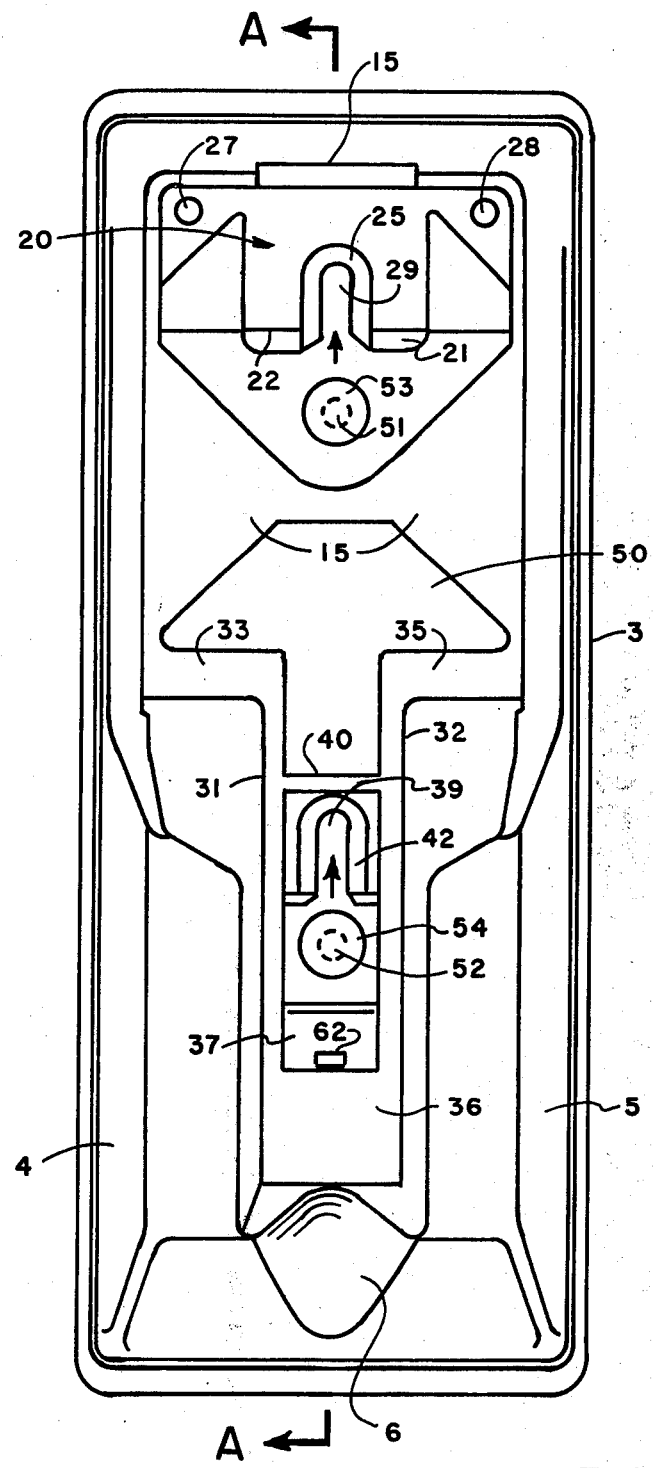
FIG. 3 is a front view illustrating the interior mounting structures and method of installing the cradle assembly.
Figure 4:
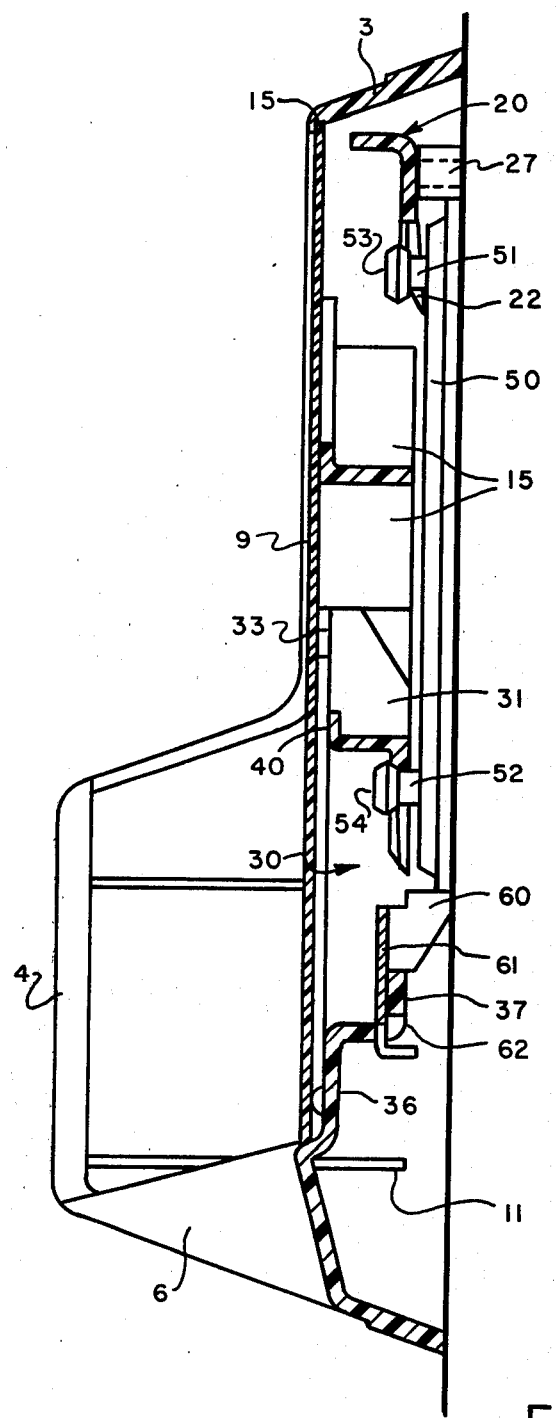
FIG. 4 is a sectional view taken substantially along line A—A of FIG. 3.

Mounting structures 20 and 30 are designed to be easily mounted to typical wall telephone receptacle plates such as the one shown in FIG. 4. Receptacle plate 50 is comprised of a planar base surface and a pair of outwardly extending studs 51 and 52, each including a flange 53, 54 on their free ends respectively. As can be readily seen in FIG. 3 upper stud 51 cooperates with receiving channel 29 and lower stud 52 with receiving channel 39. Upper mounting structure 20 further includes mounting holes 27 and 28 arranged to accept threaded fasteners therein. This allows mounting of the cradle assembly on vertical surfaces where a telephone receptacle plate is not available.

To attach cradle assembly 1 to receptacle plate 50, alignment as shown in FIG. 3 is first established and pressure is applied to the lower mounting structure 30 at transverse member 40, flexing the mounting structure towards the receptacle plate. The housing is then slid downward allowing receiving channel 39 to straddle stud 52 with flange 54 resting on channel 39's beveled surface 42. Simultaneously receiving channel 29 straddles upper stud 51 and similarily flange 53 rest on beveled surface 25. The housing is moved downward sufficiently to allow the inclined tongues 21 and 22 to be wedged between the receptacle plate base surface and flange 53, as shown on FIG. 4. Pressure is then relieved on the lower mounting structure which begins to return to its original position but is retained by the underside of flange 54. Lower mounting structure 30 then maintains a force on the housing outer walls holding rim 15 rigidly on the vertical surface or wall.

The combination of resilient tongues 21 and 22 of upper mounting structure 20 and the flexibility of lower mounting structure 30 allows the cradle assembly to be mounted to receptacle plates having studs of various heights. Additionally the resilience of arms 33 and 35 reduces the strain to the outer housing allowing the housing to maintain its outer form as receiving channel 39 is mounted on its respective stud.

To lock the cradle assembly on the receptacle plate a locking body 60 is installed as shown in FIG. 4. Section 61 of locking body 60 is inserted into an orifice 62 found on the lower mounting structure 30 and tail tabs bent in apposing directions. The locking body is then wedged between a bottom edge of receptacle plate 50 and member 37. As can be seen on FIG. 4 this prevents the cradle assembly from moving upwards and off the receptacle plate studs.

It will of course be appreciated by those skilled in the art that minor variations of the cradle assembly described herein may be made without departing from the scope of the invention.

What is claimed is:

1. A wall-mounted assembly for receiving a telephone set, said assembly adapted to be secured to a wall-mounted receptacle plate having a front face and first and second mounting studs extending outwardly from said front face, said wall mounted assembly comprising:
   a unitary housing having a front surface arranged for receiving said telephone set;
   first receiving means integrally joined to said housing for engaging said first mounting stud;
   flexible structure integrally joined to said housing and including second receiving means, said flexible structure adapted to be manually urged toward said receptacle plate allowing said second receiving means to engage said second mounting stud securing said wall-mounted assembly to said receptacle plate.

2. A wall mounted assembly as claimed in claim 1, wherein: said first stud includes a flanged end, and said first receiving means includes a pair of downwardly slopping tongues spaced parallel and equidistant from each other defining a slot therebetween, said slot disposed to be accommodated on said first stud wedging said tongues between said flange and said receptacle plate front face.

3. A wall-mounted assembly as claimed in claim 1, wherein: said flexible structure is comprised of:
   a pair of walls spaced parallel and equidistant from each other and each wall including first and second ends;
   a first flexible arm having one end integrally joined to each of said walls second ends and an opposite end integrally joined to said housing;
   second and third flexible arms each including first and second ends, each arm first end integrally joined perpendicular to a respective one of said walls first end, and each of said arms second end integrally joined to opposite points on said houding; and
   a center section enclosed by said walls intermediate said first, second and third arms, and including said second receiving means therein, whereby said center section is arranged to deflect when a manual force is applied to said walls and to return to a non-deflected position when said force is relieved.

4. A wall-mounted assembly as claimed in claim 3, wherein: said second stud includes a flanged end, and said second receiving means includes a pair of tongues spaced parallel and equidistant from each other defining a slot therebetween, said slot disposed to be accommodated on said stud between said flange and said receptacle plate front face when said center section is depressed.

5. A method for securing a wall mounted assembly to a wall mounted receptacle plate, said assembly including a housing and said receptacle plate including a front face and first and second mounting studs said studs extending outwardly from said front face and each including a flanged end, said method comprising the steps of:

positioning said housing over said receptacle plate, said housing including first receiving means in linear alignment with said first mounting stud and flexible structure including second receiving means in linear alignment with said second mounting stud;

applying manual pressure to said flexible structure in a first direction deflecting said structure toward said receptacle plate;

moving said housing in a direction allowing accommodation of said second receiving means on said second mounting stud between said flange and said receptacle plate front face, and simultaneously, accommodation of said first receiving means on said first mounting stud between said flange and said receptacle plate front face;

relieving the manual pressure on said flexible structure allowing said structure to deflect in a second and opposite direction securing said assembly to said receptacle plate.

* * * * *